United States Patent Office 3,660,327
Patented May 2, 1972

3,660,327
LACTONE OR LACTAM PRE-ESTERIFIED ISOCYANURATE-CONTAINING RESINS
Donald F. Loncrini and Henry J. Markowski, St. Louis, Mo., assignors to The P. D. George Company, St. Louis, Mo.
No Drawing. Filed June 8, 1970, Ser. No. 44,479
Int. Cl. C09d *3/70, 3/72*
U.S. Cl. 260—22 TN                        40 Claims

ABSTRACT OF THE DISCLOSURE

Resins, including polyesters, polyester-amides, polyester-imides, polyester-amide-imides, etc., prepared from lactone or lactam pre-esterified isocyanurate derivatives (PEIC). These resins are preferably derived from hydroxyalkyl, such as hydroxyethyl, isocyanurates, and most preferably from tris(2-hydroxyethyl) isocyanurate or its equivalent, which has been pre-esterified with a lactone, a lactam or their equivalents.

These resins may be cured with curing agents for example triazine-aldehydes such as melamine-aldehydes, phenol-aldehydes, isocyanates, etc.

These resins may be employed in electrical insulation, particularly as wire enamels, electrical varnishes, etc. as well as for other uses.

---

This invention relates to resins, including polyesters, polyester-amides, polyester-imides, polyester-amide-imides, etc., prepared from lactone or lactam pre-esterified isocyanurate derivatives (PEIC), i.e. resins derived from hydroxyalkyl, such as hydroxyethylisocyanurates, and most preferably from tris(2-hydroxyethyl) isocyanurate or its equivalent which has been pre-esterified with a lactone, a lactam or their equivalents. This invention also relates to isocyanurate pre-esterified by lactones and lactams.

These resins may be cured with curing agents for example triazine-aldehydes such as melamine-aldehydes, phenol-aldehydes, isocyanates, etc.

This invention also relates to the above resins employed in electrical insulation, particularly as wire enamels, electrical varnishes and for other uses.

Synthetic resins suitable for use as electrical insulation materials, particularly materials which are satisfactory for use as slot insulation in dynamoelectric machines and for use as insulation for conductors which are to be employed as magnet wires (insulated electrical conductors) in electrical apparatus must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as ketones, alcohols, aliphatic and aromatic hydrocarbons, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact there may be a large potential gradient between adjacent turns, it is necessary that the resin employed as wire enamels have a high dielectric strength to prevent short circuiting between adjacent coated wires. In the operation of electrical apparatus containing coiled wires, high temperatures are often encountered and the anamels must be able to withstand these high temperatures as well as the mechanical stresses and vibrations encountered in electrical apparatus so that the enamel coating does not soften, crack, or come off the wire.

Isocyanurate monomers are known which are polyfunctional derivatives of isocyanuric acid containing a plurality of —alkyl—OH groups, where the alkyl group is straight chain or branched and where the alkyl has for example 1–10 or more carbons, such as 2–4 carbons, but preferably 2 carbons, for example compounds of the formula:

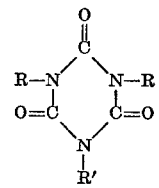

where R is —alkyl—OH and R' is hydrogen or a substituted group, such as a hydrocarbon group, for example alkyl, aryl, cycloalkyl, etc., e.g. methyl, ethyl, propyl, butyl, etc., phenyl, cyclohexyl, etc., but preferably compounds of the formula where R' is R:

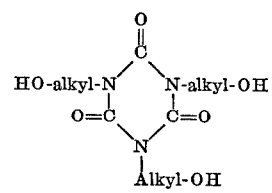

These isocyanuric derivatives are conveniently prepared as follows:

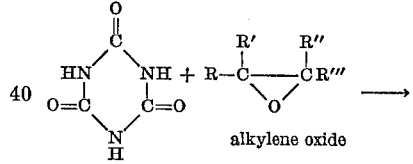

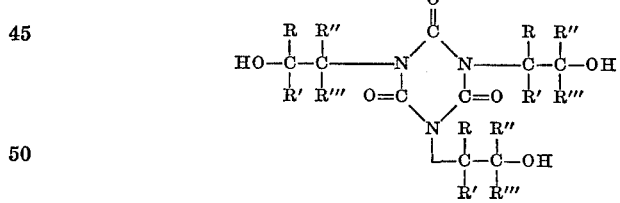

where the R's are preferably hydrogen or an alkyl group, for example where the alkylene oxide is ethylene, propylene, butylene, octylene, etc. oxides.

We have now prepared resins from PEIC derivatives having excellent mechanical, chemical, electrical and thermal properties which are adaptable for use as insulation for eletcrical conductors, such as for the use as magnet wire insulation, as slot insulation in electrical apparatus, etc.

We have prepared polyester resins from (1) polycarboxylic acids, esters, etc., (2) glycols and (3) polyols, wherein (2) or (3) are replaced in whole or in part by PEIC derivatives.

Furthermore, we have prepared polyester resins containing PEIC derivatives which may be cured or cross-linked with curing or cross-linking agents, such as, for example, polyisocyanates including the blocked isocyanates of the Mondur type (Mobay Chem. Co.), triazine resins, phenol-aldehyde resins, etc.

We have also prepared polyester-amides, polyester-amide-imides polyester-imides containing PEIC derivatives, for example such resins containing PEIC derivatives prepared from dicarboxylic acids such as phthalic acids, etc., tricarboxylic acids such as trimellitic acid or anhydride, etc., and tetracarboxylic acids such as pyromellitic acids, etc. reacted with polyamines such as diamines, hydroxyamines, such as alkanolamines, with or without glycols or polyols. These resins may also be cured or cross-linked.

We have also prepared resins containing PEIC derivatives prepared with fatty acids and/or oils, for example of long, medium and short oil content.

Thus, our invention includes but is not limited to the following:

(1) Resins which contain PEIC derivatives.
(2) The cured product of (1).
(3) Resins containing PEIC derivatives which are modified with conventional curing or modifying agents, with or without metal catalysts.
(4) Resins containing PEIC derivatives prepared with oils.

Our invention includes the use of these resins in surface coatings, laminates, films, electrical insulators, especially as wire enamels, such as electrical insulators for insulating magnet wire, as slot insulation in dyanamo-electric machines; and the use of these resins which have been "overcoated" with suitable materials.

The resins of this invention when cured on an electrical conductor provide excellent insulation.

The resins of this invention are characterized by the presence of PEIC derivatives which before polymerization contain reactive hydroxyl or amino groups. The term PEIC derivative means a compound containing a pre-esterified isocyanurate which contains reactive hydroxyl or amino groups capable of forming polyesters, polyester-amides, polyester-imides, polyester-amide-imides, etc. In these reactions the PEIC derivatives of THEIC and lactones react as polyols having three hydroxy groups and the PEIC derivatives of THEIC and lactams react as polyamines having three amino groups.

The PEIC is preferably prepared by reacting THEIC with a lactone or a lactam, for example, according to the following equation:

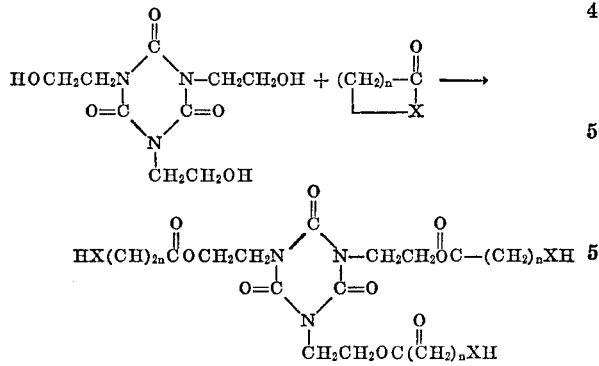

where X is O or NH
n is an integer, for example, 2–10 or more but preferably 3–6 and more preferably 5.

Where more than one lactone or lactam is added per CH₂CH₂OH group, m moles of lactone or lactam may be polymerized

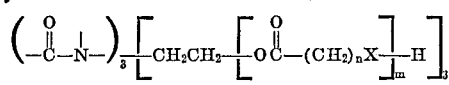

m=1–10 or more but preferably one.

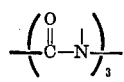

indicates the isocyanurate ring.

The side groups are attached to the nitrogen atoms of the ring.

Thus, with caprolactone the product is

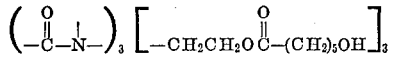

and with caprolactam

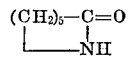

the product is

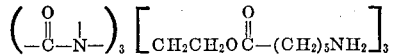

Also included within the scope of this invention are derivatives formed by adding less than three moles of lactone or lactam per THEIC to form a combination of —CH₂CH₂OH and

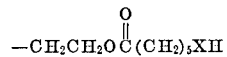

units. Thus, THEIC may have 1, 2 or 3 lactone/lactam units per molecule. In addition both lactone and lactam units may be present on the same molecule.

Provided the final resin contains PEIC derivatives, a wide variety of polycarboxylic acids, glycols and polyols can be employed.

A wide variety of polycarboxylic acids, or esters thereof can be employed in the preparation of the polyesters of this invention. In general, these include the polycarboxylic acids conventionally employed in the preparation of polyesters. These acids may possess two, three, four or more carboxyl groups, may be aliphatic, alicyclic, heterocyclic, aromatic, etc., and may be saturated or unsaturated. Examples of such acids include the alkanedicarboxylic acid, for example those of the formula

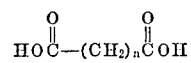

where $n=1$–10 or more such as malonic, succinic, glutaric, adipic, pimelic, suberic, azelaic, sebacic, etc., acids, isomers thereof where the alkylene group is branched and/or one or more of the carboxyl groups is not terminal; substituted alkanedicarboxylic acids such as chloro-succinic, etc.; alicyclic dicarboxylic acids, such as cyclohexanedicarboxylic acid, etc.; aromatic acids such as phthalic, isophthalic, terephthalic, diphenic, hemimellitic, trimellitic, 1,8-naphthalenic acid, pyromellitic acids, benzophenone dicarboxylic acid, dichlorophthalic acids; unsaturated acids such as fumaric, maleic, muconic, citraconic, mesaconic, glutaconic, (cis and trans), aconitic (cis and trans), bromo-maleic, etc.; hydroxyacids such as citric, maleic, tartaric, etc. acids; dimeric fatty acids such as dilinoleic acid, etc.; tris(2-carboxyethyl) isocyanurate; adducts of maleic acids with various unsaturated and/or conjugated hydrocarbons such as diisobutylene, butadiene, rosin, abietic acid, terpolene, cyclopentadiene, linoleic acid, etc.; diglycollic acid, ethylenebisdiglycollic acid, etc.

The preferred polycarboxylic acids are the dicarboxylic acids containing from 2 to 10 carbon atoms, such as succinic, glutaric, adipic, suberic, maleic, phthalic, isophthalic, terephthalic, and the like. Particularly preferred polycarboxylic acids are the aromatic dicarboxylic acids, containing from 6 to 10 carbon atoms wherein the two carboxyl groups are attached directly to the aromatic nucleus such as the phthalic acids, but most preferably isophthalic and terephthalic acids.

Pyrrolidone carboxylic acids and preferably pyrrolidone dicarboxylic acids can be employed in preparing the resins of this invention.

Pyrrolidone carboxylic acids are prepared by reacting itaconic acid with amines according to the following equation:

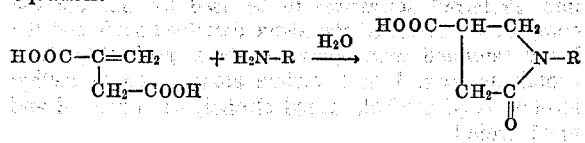

Preparations according to this reaction are described in Journal Am. Chem. Soc. 72, 1415 (1950) in which the pyrrolidone carboxylic acids were prepared by the following general procedure:

A mixture of itaconic acid, amine and water in the ratio of one mole of acid to each amino group and refluxed for 45–60 minutes or until the odor of the amine is faint, after which the mixture is chilled in an ice-bath. The product is filtered, washed with cold water and then dissolved in aqueous sodium hydroxide, treated with charcoal, filtered and acidified with dilute hydrochloric acid. The precipitated pyrrolidone is recrystallized from water, dilute alcohol, alcohol, dilute acetic acid or dilute hydrochloric acid.

TABLE I

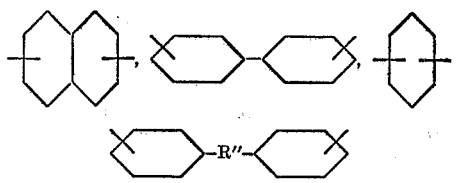

| Amine: | R group of pyrrolidone |
|---|---|
| Aniline | Phenyl. |
| o-Toluidine | 2-tolyl. |
| m-Toluidine | 3-tolyl. |
| p-Toluidine | 4-tolyl. |
| Benzylamine | Benzyl. |
| Cyclohexylamine | Cyclohexyl. |
| 3,5,5-trimethylhexyl-amine | 3,5,5-trimethylhexyl. |
| Phenylhydrazine | Anilino. |
| o-Aminodiphenyl | 2-diphenyl. |
| p-Aminodiphenyl | 4-diphenyl. |
| a-Naphthylamine | a-Naphthyl. |
| b-Naphthylamine | b-Naphthyl. |
| p-Aminoazobenzene | Azobenzene. |
| o-Chloroaniline | 2-chlorophenyl. |
| m-Chloroaniline | 3-chlorophenyl. |
| p-Chloroaniline | 4-chlorophenyl. |
| p-Bromoaniline | 4-bromophenyl. |
| Chloroanisidine | 2-methoxy-5-chlorophenyl. |
| 2,4-dichloroaniline | 2,4-dichlorophenyl. |
| 2,5-dichloroaniline | 2,5-dichlorophenyl. |
| m-Nitroaniline | 3-nitrophenyl. |
| p-Nitroaniline | 4-nitrophenyl. |
| o-Aminophenol | 2-hydroxyphenyl. |
| m-Arminophenol | 3-hydroxyphenyl. |
| p-Aminophenol | 4-hydroxyphenyl. |
| o-Anisidine | 2-methoxyphenyl. |
| p-Anisidine | 4-methoxyphenyl. |
| b(3,4-dimethoxyphenyl) ethylamine | b-(3,4-dimethoxyphenyl)-ethyl. |
| m-Aminobenzoic acid | 3-carboxyphenyl. |
| p-Aminobenzoic acid | 4-carboxyphenyl. |
| p-Phenylenediamine | 4-aminophenyl. |
| p-Phenylenediamine | 4-aminophenyl-HCl. |
| p-Phenylenediamine | p-Pyrrolidonylphenyl. |
| Benzidine | p-Pyrrolidonyldiphenyl. |
| Sulfanilamide | 4-sulfoamidophenyl. |
| Sulfaguanidine | Sulfaguanido. |

In the case of diamines, the reaction occurs to yield a pyrrolidone dicarboxylic acid of the following general formula

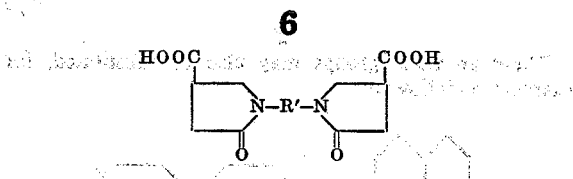

where R' has the meaning derived from the diamines described below.

The organic polyamines used in preparing the pyrrolidone dicarboxylic acids include those having the structural formula $H_2N—R'—NH_2$, wherein R', a divalent radical containing at least two carbon atoms, may be aromatic, aliphatic, cycloaliphatic, a combination of aromatic and aliphatic or substituted groups thereof, etc. The preferred R' groups in these diamines are those containing at least six carbon atoms and characterized by benzenoid unsaturation. Examples of these groups are:

and the like where R" is hydrocarbon, for example,

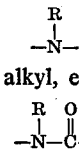

where R is hydrogen, alkyl, etc.; amino, for example

where R is hydrogen, alkyl, etc.; amido,

where R is hydrogen, alkyl, etc.; azo-, $—N{=}N—$; ester,

oxygen, —O—; silicon or silicon-containing, for example —Si—,

where R is hydrogen, alkyl, etc.; ketone,

phosphorus or phosphorus-containing, for example —P—,

where R is hydrogen, alkyl, etc.,

sulfur, —S—,

where R is hydrogen, alkyl, etc.; sulfone,

sulfoxide, etc.

These aromatic groups may also be substituted, for example, as follows:

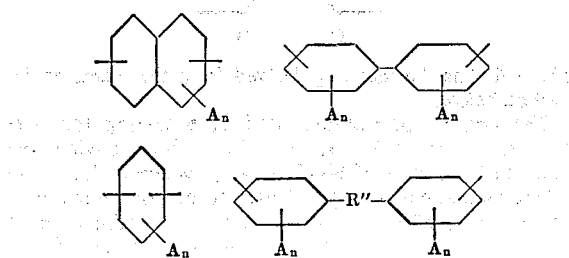

where A is a substituted group for example alkyl, alkoxy, halo, nitro, etc. and $n$ is a number for example 0–4 inclusive.

Among the diamines which are suitable for use in the present invention are:

4,4'-diamine-diphenyl propane;
4,4'-diamino-diphenyl methane;
benzidine;
3,3'-dichloro-benzidine;
4,4'-diamino-diphenyl sulfide;
3,3'-diamino-diphenyl sulfone;
4,4'-diamino-diphenyl sulfone;
4,4'-diamino-diphenyl ether;
1,5-diamino-naphthalene;
meta-phenylene-diamine;
para-phenylene-diamine;
3,3'-dimethyl-4,4'-biphenyl diamine;
3,3'-dimethoxy benzidine;
bis-(beta-amino-t-butyl) toluene;
bis(para-beta-amino-t-butyl-phenyl) ether;
bis(para-beta-methyl-delta-amino-pentyl) benzene;
bis-para-(1,1-dimethyl-5-amino-pentyl)benzene;
1-isopropyl-2,4-meta-phenylene diamine;
m-xylylene diamine;
p-xylylene diamine;
di(para-amino-cyclohexyl)methane;
hexamethylene diamine;
heptamethylene diamine;
octamethylene diamine;
nonamethylene diamine;
decamethylene diamine;
diamino-propyl tetramethylene diamine;
3-methylheptamethylene diamine;
4,4-dimethylheptamethylene diamine;
2,11-diaminododecane;
1,2-bis-(3-amino-propoxy)ethane;
2,2-dimethyl propylene diamine;
3-methoxy-hexamethylene diamine;
2,5-dimethylhexamethylene diamine;
2,5-dimethylheptamethylenediamine;
3-methyl-heptamethylene diamine;
5-methylnonamethylenediamine;
2,11-diamino-dodecane;
2,17-diamino-eicosadecane;
1,4-diaminocyclohexane;
1,10-diamino-1,10-dimethyl decane;
1,12-diamino-octadecane;
$H_2N(CH_2)_3O(CH_2)_2NH_2$;
$H_2N(CH_2)_3S(CH_2)_3NH_2$;
$H_2N(CH_2)_3N(CH_3)(CH_2)_3NH_2$;
piperazine.

A plurality of the above polyamines can also be employed, for example 2, 3, 4 or more of these amines, in preparing the resin.

In some cases it may be desirable to utilize other forms of the acids, such as the acid anhydrides or acid chlorides, such as phthalic anhydride, maleic anhydride, trimellitic anhydride, trimellitic anhydride acid chloride, pyromellitic anhydride, succinic chloride and the like.

The esters of the polybasic acids may be utilized where the resins are to be produced by an ester-exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, propyl alcohol, butyl alcohol and amyl alcohol.

The glycol (apart from the PEIC derivatives) employed in preparing the resins can vary widely. In general, they are the glycols conventionally employed in preparing polyesters. Suitable examples include the following: alkylene glycols of the formula $H(OA)_nOH$ where $n$ is for example 1–10 or higher and A is alkylene; ethylene; propylene, butylene, etc., for example ethylene glycol, diethylene glycol, propylene glycol, dipropylene glycol, tripropylene glycol, triethylene glycol, butylene glycol, tetramethylene glycol, neopentyl glycol, 2-methyl-1,3-pentanediol, 1,5-pentanediol, hexamethylene glycol, xylylene glycol, etc. Preferably, one employs an alkane-diol of the general formula $HO(CH_2)_nOH$ where $n=2-5$ or isomers thereof. The preferred glycol is ethylene glycol.

The polyols (apart from PEIC derivatives) used in the preparation of the resins of this invention can vary widely and are those containing at least three esterifiable hydroxyl groups. In general, these are the polyhydric alcohol conventionally employed in preparing polyesters. Illustrative examples of such alcohols are glycerol, polyglycerol, pentaerythritol, mannitol, trimethylol-propane, trimethylolethane, 1,2,6-hexanetriol, polypentaerythritol, polyallyl alcohol, polymethallyl alcohol, tris(2-hydroxyethyl) isocyanurate (THEIC), polyols formed by the condensation of bisphenols with epichlorohydrin and the like.

Preferred polyhydric alcohols to be used in the preparation of these polyesters are the aliphatic alcohols possessing from 3 to 6 hydroxyl groups and containing from 3 to 14 carbon atoms, such as glycerol, pentaerythritol, mannitol, 1,4,6-octanetriol, 1,3,5-hexanetriol and 1,5,10-dodecanetriol. Other preferred alcohols include THEIC.

It should be understood that mixtures of more than one polycarboxylic acid, more than one glycol and more than one polyol can be employed.

The ratio of (1) polycarboxylic acids to (2) glycols to (3) polyols can vary widely depending on many variables such as the specific compounds employed, the intended use, the modifying agents, etc. PEIC derivatives are included within (2) and (3).

For example, the polyester can comprise the product of (1) from about 20 to 65 equivalent percent, such as from about 25 to 55% but preferably from about 35 to 50% of a polycarboxylic acid; (2) from about 5 to 40 equivalent percent, such as from about 10 to 35% but preferably from about 8 to 20% of a glycol (including PEIC derivatives); and (3) from about 10 to 75 equivalent percent, such as from about 15 to 60%, but preferably from about 20 to 50% of a polyol (including PEIC derivatives). The sum of (1), (2) and (3) above equals 100 equivalent percent.

In the preferred specific polyester of the present invention where a phthalic acid, preferably iso- or terephthalic acids, PEIC derivatives and ethylene glycol are reacted, the ratio employed to achieve an excellent product is as follows:

(1) The phthalic acid such as iso- and terephthalic acids of from about 40 to 60, for example from about 45 to 55, but preferably about 47 to 52 equivalent percent.

(2) Ethylene glycol from about 5 to 35, for example from about 8 to 30, but preferably from about 15 to 25 equivalent percent.

(3) PEIC derivatives, from about 15 to 60, for example from about 20 to 50, but preferably from about 25 to 45 equivalent percent.

The polyester resins of the present invention may be prepared in fairly conventional ways. Thus, the lower dialkyl ester of terephthalic acid or isophthalic acid, PEIC derivative and the polyhydric alcohol and/or glycol are added to any suitable reaction vessel and reacted. This reaction vessel may be formed of any suitable material such as glass, stainless steel or any of the other metals commonly employed in processing polyester resins. Since the reaction involved in forming the polyester resins of the present invention is essentially an alcoholysis reaction, the net effect of the reaction is to substitute a polyhydric alcohol or a glycol for the lower alkyl radical of the lower dialkyl isophthalates or terephthalates with the concurrent liberation of the lower alcohol. In the case of the dimethyl esters of the acids the alcohol which is liberated is methanol. Therefore, suitable means should be provided for eliminating the methanol or other lower alcohols liberated during the reaction period. In general, heat is applied to the reaction mixture and the lower alcohol liberated is either vented to the atmosphere or collected in a condenser system. Since the lower dialkyl esters of terephthalic acid have a tendency to sublime when heated too rapidly, it is desirable to provide means for condensing this sublimate while still allowing the lower alcohols to escape from the system. This may be accomplished by operating a condenser over the reaction vessel at a temperature suitable to condense the sublimate while allowing the lower alcohol vapors to escape.

Since alcoholysis reactions are rather slow when run without catalysts, we prefer to use alcoholysis catalysts when preparing the polyester resins of the present invention. Among the many alcoholysis catalysts which may be used are included for example, lead oxides, lead acetate, zinc oxide, cadmium acetate, cuprous acetate, zinc acetate, magnesium acetate, beryllium acetate, stannic acetate, ferric acetate, nickel acetate, etc. The amount of catalyst employed is not critical and may vary over a wide range depending on the partciular polyester system under consideration. In general, we employ from about 0.01 to about 5 percent, by weight, of the alcoholysis catalyst, based on the total weight of polyester resin. Higher concentrations of such catalyst may be employed but no advantage is gained by such use. Preferably we employ about 0.1 percent, by weight, of the metallic component of catalyst based on the total weight of the resin employed.

In preparing the polyester resins of the present invention we have found it desirable to heat the reactants to obtain as high a molecular weight material as possible without causing gelation of the resulting product. The reaction is accomplished by heating the reactants from room temperature to a temperature of about 390° to 500° F. but preferably 400–450° F. over a period of from two to ten or more hours. During the initial heating period it is sometimes found that sublimation of the lower dialkyl esters of the acids employed begins to occur. To prevent this sublimation, xylene or some similar material may be added to the reaction mixture to keep the lower dialkyl ester of the acid in solution. The xylene or other similar material takes no part in the reaction and is distilled from the reaction mixture during the course of the reaction. Any water which is present in the raw materials employed in the reaction is also distilled from the reaction mixture during the heating process. One source of moisture commonly found in the reaction mixture is the water which may be dissolved in the polyol.

The alcoholysis catalyst may be added to the reaction mixture at the beginning of the heating period or after the reactants have been heated for a short length of time to remove any water present in the raw materials employed. After heating the reactants to the desired final temperature between about 390 and 500° F. but preferably 400–450° F. the reaction may be stopped or the product may be maintained at the final temperature for another 2 to 4 hours to increase the molecular weight. When the product is maintained at this final temperature it is necessary to stop the reaction before the resin reaches such a high molecular weight that gelatin occurs.

The reaction is generally terminated by pouring a suitable solvent into the hot polyester resin to form a solution having a solids content of about 25 to 50 percent, by weight. This solution is then filtered to remove any insoluble matter. Among the many solvents suitable for the polyester resins employed in the present invention may be mentioned cresylic acid, m-cresol, xylenols, polyhydroxy benzenes, xylene and other polyalkyl benzenes, high boiling petroleum hydrocarbons, such as Solvesso 100, Solvesso 150, the M. L. solvents such as dimethyl formamide, dimethyl acetamide, N-methyl pyrrolidones, etc.

Instead of dissolving the polyester resins of the present invention in a solvent, it is sometimes desirable to use the resinous materials without a solvent being present. For these applications the resin is merely allowed to cool down to room temperature without the addition of any type of solvent. This results in a brittle solid mass which may be ground into a powder if desired for further use. Where the resin has been obtained in powder form and it is subsequently desired to use it in solution, the resin may be added to a suitable solvent and the mixture heated up to a temperature of about 212° F. until complete solution of the resin takes place.

The present invention also relates to oil-modified resins derived from PEIC-containing resins which are prepared with fatty acids and/or oils, for example of long, medium, or short oil content; to uses therefor, including electrical conductors coated therewith; and more particularly to the use of said oil-modified polyesters as electrical insulating varnishes.

We have particularly found that said oil or fatty acid modified polyesters, particularly those containing certain resins, for example oil-soluble phenol-aldehyde resins, can be made into outstanding electrical insulating varnishes. In the preferred embodiments we have found that certain oil or fatty acid modified polyesters prepared from a polycarboxylic acid and PEIC derivatives particularly those which contain a glycol and/or polyol, and more particularly those which also contain oil soluble resins, such as phenol-aldehyde resins, can be used to prepare outstanding electrical insulating varnishes.

In general, the compositions of the present invention are prepared by employing a fatty acid or oil in conjunction with PEIC derivatives so as to produce the corresponding oil modified resins. The general process for preparing oil modified resins is so well known to the art that we shall not go into such preparation in great detail. Preparation can be effected by alcoholysis or acidolysis.

Representative fatty oils which may be used in the practice of the present invention are included the non-drying, semi-drying, and drying fatty oils, including vegetable oils, animal oils, marine oils and treated marine oils, such as soya, cottonseed, hydrogenated cottonseed, linseed, castor, hydrogenated castor, dehydrated castor, cocoanut, tung, oiticica, menhaden, hempseed, grapeseed, corn, codliver, candelnut, walnut, perilla, poppyseed, safflower, conjugated safflower, sunflower, rapeseed, Chinawood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids including fatty acids may be illustrated by the following: abietic acid, benzoic acid, caproic acid, caprylic acid, castor fatty acid, cocoanut fatty acid, cottonseed fatty acid, crotonic acid, DCO FA, i.e. primarily

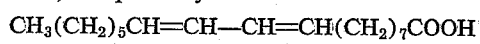

2-ethyl hexoic acid, lauric acid, linoleic acid, linolenic acid, linseed FA, oleic acid, pelargonic acid, Rosin acid (AN 165), soya FA, Tall Oil FA (An 195, AN 192), etc.

Percentage oil length normally refers to the oil portion of the resin expressed as a percentage of the total weight of the finished resin. It is equal to the weight of any fatty acid in the resin taken together with the weight of a polyol needed to completely esterify this fatty acid (minus weight of evolved water of esterification) expressed as a percentage of the total solids content of the finished resin.

Thus, for purposes of this invention an oil modified polyester includes polyesters modified with fatty acids as well as oils. The oil-modified polyesters may be of long, medium or short oil content, but is preferably of long oil content; where a fatty acid is employed, it may also be long, medium or short, i.e. having proportionate ranges of fatty acids calculated as glycerides and/or PEIC derivatives as compared to the oils. These terms have the following meanings: Short oil 30–45%; medium oil 45–55%; long oil 55–75%, weight of oil based on total weight of the polyester formulation including the oil. Lesser amounts of oil such as 25% or lower or greater amounts of oil, such as 75–80% or greater, may be employed in certain instances.

The oil modified polyester resins of this invention can be further modified by employing various resins in conjunction therewith.

Included among such resins are phenol-aldehyde resins, phenol-sulfur resins, phenol-acetylene resins, including resins produced from phenol and substituted phenols, including difunctional, tri-functional and tetrafunctional phenols, naphthols, bisphenols, salicylic acid and salicylates, etc., modified phenolic resins, including phenol-terpene resins, phenol-terpene-aldehyde resins, phenol - naphthalene - aldehyde resins, pheno-urea-formaldehyde resins, phenol - aniline - formaldehyde resins, phenol-glycerol, resins, etc., non-phenolic resins having the necessary labile or reactive hydrogen including urea and substituted urea-aldehyde resins, sulfonamide-aldehyde resins, melamine-aldehyde resins, polycarboxy-polyamine resins, resins derived by ring hydrogenation of phenolic resins, and the like.

The compositions of this invention can be employed to prepare insulating varnishes and in particular varnishes yielding electrical conductor coatings having improved properties. These varnishes are particularly valuable for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors, and other electrical equipment.

In preparing the insulating varnishes of the present invention, in addition to the oil modified polyester resins there is normally used an oil-soluble phenol-aldehyde resin. The phenol-aldehyde resin gives the varnish heat reactivity, improves electrical properties, aids in the cure and lends hardness and abrasion resistance to the product. Among the oil-soluble phenol-aldehyde resins which can be used are p-tertiary octylphenol-formaldehyde, p-phenyl-phenol-formaldehyde, 2,2 - bis(p-hydroxyphenyl) propane-formaldehyde and o-tertiary butylphenol-formaldehyde. Other suitable phenol-formaldehyde resins are shown in Honel Pat. 1,800,296. Substituted phenols alone or in conjunction with unsubstituted phenol can be used in forming the oil-soluble phenolic resin. While the phenolic resin can be prepared using an acid catalyst, they are generally prepared using alkaline catalysts as is well known in the art. Thus, the p-tertiary butylphenol-formaldehyde resin employed may be prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The oil-soluble phenol-formaldehyde resins are of the heat-reactive type. The oil-soluble phenol-formaldehyde resin is usually employed in an amount of 10% to 80% by weight of the total of the oil modified polyester and phenolic resin, such as 15–40%, but preferably 20–30%. Increasing the amount of phenolic resin speeds the cure but also sacrifices ageing characteristics. Hence, the amount of phenolic resin is preferably kept at about 20% by weight. It is also possible to eliminate the phenolic resin from the varnish with resulting loss of the advantages from having the phenolic resin present. It is also possible to replace part of the phenolic resin with other heat-reactive resins, e.g., furane resins, triazine resins, urea-formaldehyde, melamine-formaldehyde and epoxy resins, e.g. bisphenol A-epichlorohydrin resin, although the preferred heat-reactive resins are phenolic resins since they impart the best combination of improved properties, all things considered. Rosin-modified phenolics are also advantageously employed.

In addition to the resin components, the insulating varnish also includes one or more solvents, such as xylene, mineral spirits, isophorone, naphtha, toluene, etc.

The insulating varnishes of the instant invention have properties which warrant their use at Class H temperatures. They can withstand temperatures in excess of 180° C. for the normal life of a motor or transformer in which they are utilized. The cured varnishes are highly resistant to oil, chemicals and moisture.

The varnishes in accelerated ageing tests have retained their toughness, flexibility, excellent bonding strength and high dielectric properties after heat ageing for as long as 20,000 hours at over 200° C., based on extrapolated values. The varnishes can be applied by vacuum impregnation or free dip system. They cure readily under infrared heat or in forced air ovens. Baking is normally done at 375° F. to 400° F., although lower temperatures can be used.

A typical insulating varnish is prepared by formulating the resin of this invention with a phenolic resin, usually in a dilute solution for example from about 25–75% solids, but preferably as a 50% solution. Other conventional additives can be employed, for example a drier or curing agent may be employed, for example manganese, zinc, lead, titanium, cadmium, boron, thorium, etc. salts, such as the naphthenates, octoates, tallaes etc., thereof for example in ratios of 1–10 parts or more of drier per 1000 parts by weight of resin.

The following is a typical example:

OIL MODIFIED EXAMPLE I O.M.

| Materials | Weight (grams) | Moles | Equivalent (percent) |
|---|---|---|---|
| Tall oil fatty acid | 317.00 | 1.1 | 21 |
| Isophthalic acid | 122.00 | 0.74 | 28 |
| THEIC-caprolactone (Example A) | 568.00 | 0.9 | 51 |
| Xylene | 50.00 | | |

The mixture was heated under a carbon dioxide flush to 237° C. until a acid number of 13.0 and a Gardner-Holt viscosity of T¼ at 50% solids in mineral spirits was obtained. The resin was diluted to 50% solids with a solvent blend consistency of 6% mineral spirits, 6% xylene and 88% high-flash VM and P naphtha.

O.M. Ex. I(A).—To 400 g. of Ex. I O.M. was added 100 g. of a 50% solution of phenolic resin, 1.5 g. of a 6% solution of manganese drier and 0.6 g. of anti-skinning agent. The material after curing for five hours at 150° C. was flexible and useful as an electrical insulating varnish.

O.M. Ex. I(B).—To 100 g. of Ex. I O.M. was added 25 g. of 66% solution of melamine resin, 0.4 g. of a 6% solution of manganese drier and 0.15 g. of anti-skinning agent. The material after curing for two hours at 150° C. formed a tough film which is useful as an electrical insulating varnish.

IMIDO AND/OR AMIDE RESINS CONTAINING PEIC DERIVATIVES

In addition to polyester resins prepared from PEIC derivatives, one can also employ PEIC derivatives in polyamide-polyester resins, polyimide-polyester resins, polyamide-polyimide-polyester resins. For example, when tetracarboxylic acids are reacted with a polyamine there are formed polymers of the formula:

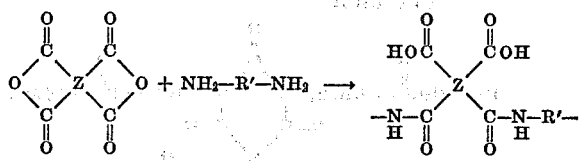

which react further at higher temperatures to form polyimides, for example

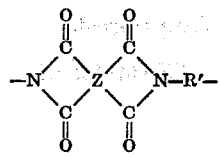

PEIC derivatives are employed to modify these resins.

Similarly when tricarboxylic acids react with polyamines, poly-imide-amides are formed, for example

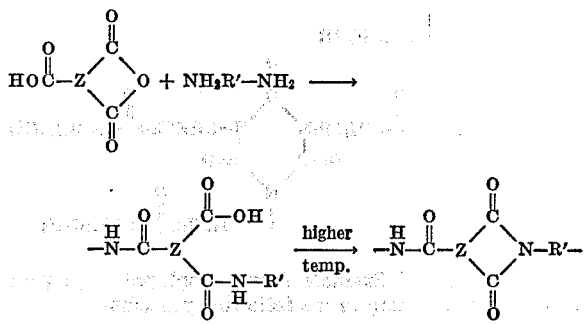

where Z is the moiety of the polycarboxylic acid, such as aliphatic, cycloaliphatic, arylic, etc., but preferably arylic; and R' is the moiety of the polyamine, for example aliphatic, cycloaliphatic, arylic etc., but preferably arylic. PEIC derivatives can also be employed to modify these resins.

The tetracarboxylic acid dianhydrides useful in this invention are characterized by the following formula:

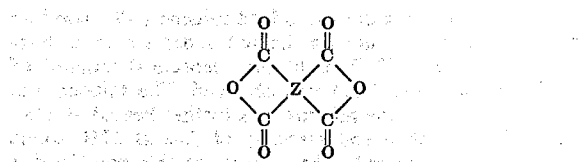

where Z is a tetravalent radical, e.g., aromatic, aliphatic, cycloaliphatic, combination of aromatic and aliphatic, or substituted group thereof. The preferred dianhydrides are those in which the Z groups have at least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical to provide a 5-membered ring as follows:

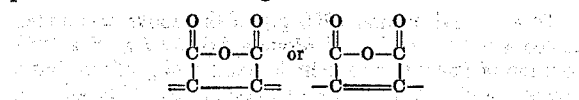

Illustration of dianhydrides suitable for use in the present invention include: pyromellitic dianhydride; 2,3,6,7-naphthalene tetracarboxylic dianhydride; 3,3',4,4'-diphenyl tetracarboxylic dianhydride; benzophenone tetracarboxylic dianhydride, 1,2,5,6-naphthalene tetracarboxylic dianhydride; 2,2',3,3'-diphenyl tetracarboxylic dianhydride; 2,2-bis(3,4-dicarboxyphenyl) propane dianhydride; bis(3,4-dicarboxyphenyl) sulfone dianhydride; perylene 3,4,9,10-tetracarboxylic acid dianhydride; bis(3,4-dicarboxyphenyl) ether dianhydride; bis (3,4-dicarboxyphenyl) sulfone dianhydride and ethylene tetracarboxylic acid dianhydride.

Although trimellitic acid or its anhydride (TMA) is the preferred tricarboxylic acid, other suitable tricarboxylic acids or anhydrides can be employed, for example,

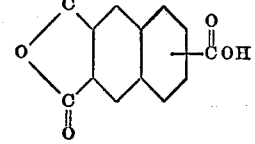

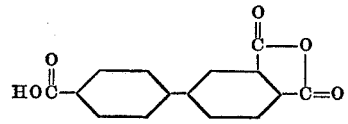

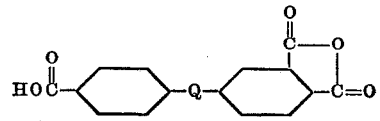

where Q is for example alkylene such as

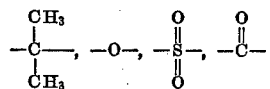

etc.

The organic diamines usable in preparing imides and/or amides are those having the structural formula $H_2N—R'—NH_2$, where R' has the same meaning as in the diamines employed in preparing the pyrrolidone dicarboxylic acids.

These polyamines can be employed with any of the polycarboxylic acids specified herein including dicarboxylic acids, tricarboxylic acids, tetacarboxylic acids, etc.

These polyamides, polyimides, polyamide-imides, polyamide-esters, polyamide-imide-esters, etc. can be modified by employing therein the PEIC derivatives of this invention, either alone or in combination with other glycols and/or polyols, for example those specified herein.

Trimellitic acid or anhydride can be pre-reacted with various reactants and these products later reacted to form polyesters, polyester-amides, polyester-imides, etc. For example

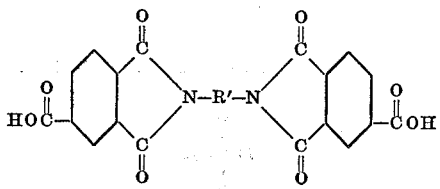

where R' is a group derived from a diamine for example any of the diamines $NH_2—R'—NH_2$ described above.

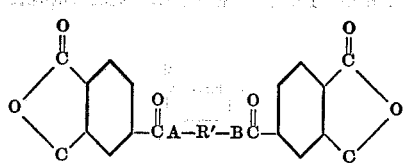

such as described in U.S. Pat. 3,182,073, where A and B are O, $$-\underset{|}{\overset{H}{N}}-$$

S, etc. and R' is any of the R' groups on the diamine $NH_2-R-NH_2$ described above.

These can be further reacted to form polyesters, polyester-amides, polyester-imides, etc.

If desired the following compositions may also be utilized in modifying the resins of this invention:

(1) Monocarboxylic acids, either saturated or unsaturated.
(2) Natural resins for example rosin, copals and ester gums, etc.
(3) Terpenes (for example the Petrex type resins), etc.
(4) Diels-Alder addition products, for example

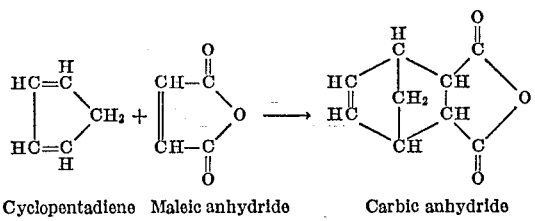

Cyclopentadiene   Maleic anhydride   Carbic anhydride (5) Unsaturated alcohols, for example allyl alcohol-glycol maleates, etc.
(6) Vinyl copolymers, for example reacted with maleic anhydride, such as styrene, vinyl chloride, vinylidene chloride, vinyl acetate, the acrylates and methacrylates, polyolefins, such as polyethylene, polypropylene, etc.
(7) Epoxide resins such as the reaction product of epichlorohydrin and bisphenol-A, etc.
(8) Silicone resins, etc.
(9) Cellulose acetate resins, etc.
(10) Polyamide resins such as the nylon type resins, etc.
(11) Buton resins (styrene-butadiene copolymers modified with maleic, etc.)
(12) Other modifying agents employed in the resin art.

Although a wide variety of lactones, lactams or combinations thereof can be employed in preparing the PEIC derivative such as those of the formula

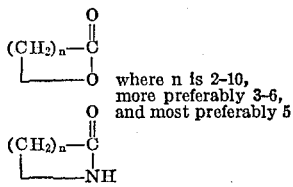

where n is 2-10,
more preferably 3-6,
and most preferably 5

(including derivatives thereof such as where $(CH_2)_n$ is $$(-\underset{\underset{R}{|}}{\overset{\overset{R}{|}}{C}}-)_n$$

where the R's may be the same or different and where R is hydrogen, alkyl, cycloalkyl, aryl, etc.)

We will illustrate our invention with caprolactone

wherein three moles of the lactone are reacted with one mole of THEIC as follows:

EXAMPLE A

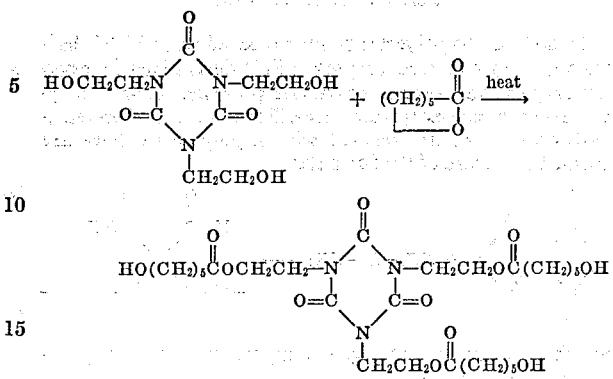

The lactam is similarly reacted.

EXAMPLE AI

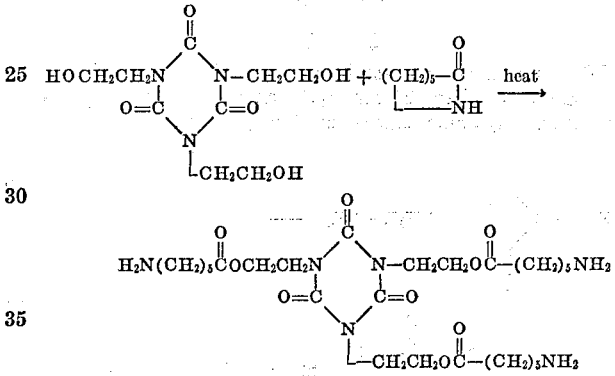

The product of Example A was employed to prepare a polyester according to the following procedure:

EXAMPLE I

|  | Equiv. percent |
|---|---|
| 253 grams of dimethylterephthalate | 40 |
| 546 grams of THEIC-caprolactone (Ex. A) | 40 |
| 41 grams of ethylene glycol | 20 |

0.5 gram of tetrabutyl titanate catalyst (TBT).
248 grams of cresylic acid.

To the above mixture was added toluene (5% based on solids) and the mixture was heated under a carbon dioxide blanket to 235° F. until the theoretical amount of methyl alcohol (83.0 g.) was obtained. The toluene was then removed and the mixture was further heated at 235° C. until a Gardner-Holt viscosity of Z-2 at 37% solids in cresol was obtained. The mixture at this point had a solids content of seventy-four percent which was then diluted to 30% solids with 1025.0 g. of cresylic acid and 425.0 g. of Solvesso 100.

EXAMPLE IA

To one portion (1500 g.) of the above was added at room temperature 13.25 g. of tetrabutyl titanate. This solution was filtered and applied on wire.

EXAMPLE IB

To a second portion (900 g.) of the above was added at room temp. 13.25 g. of Mondur-SH; 39.7 g. of a 40% solution of Phenolformaldehyde resin; 7.94 g. of tetrabutyl titanate, and 3.53 g. of cobalt naphthenate. This solution was filtered and applied on wire.

EXAMPLE II

Example I was repeated and the product (30% solids) was divided into three portions.

EXAMPLE IIA

To 900 g. of the above was added at room temperature 13.25 g. of Mondur SH; 39.70 g. of 40% phenol-formaldehyde resin; 7.94 g. TBT; and 3.5 g. of cobalt naphthenate. This solution was filtered and applied on a wire.

EXAMPLE IIB

To another portion (1525 g.) of II was added 21.4 g. of Mondur SH, 41.3 g. of a 40% solution of phenol-formaldehyde resin, 84.3 g. of a 15% solution of tetrabutyl titanate in a cresylic acid-Solvesso 100 mixture, and 5.6 g. of a 60% solution of cobalt naphthenate. This solution was applied on wire.

EXAMPLE IIC

To 1480 g. of solution IIB above was added 15 g. of a chlorinated biphenyl (Monsanto Arochlor 1221). This solution was applied on wire.

EXAMPLE III

The procedure of Example I was repeated.

EXAMPLE IIIA

One portion was modified as in 1B except that a 15% solution of TBT in a cresylic acid-Solvesso 100 was used rather than TBT solids. This was applied on wire.

EXAMPLE IIIB

To 1300 g. of solution of Example IIIA was added 13 g. of Arochlor 1221 and applied on wire.

EXAMPLE IV

This example utilizes a mixture of THEIC-caprolactone adduct and an adduct prepared by adding three equivalents of ethylene oxide to one equivalent of THEIC.

Equivalent percent

Dimethyl terephthalate, 544 g. _____ 41
Ethylene oxide-THEIC adduct, 516 g. _____ 27
THEIC-caprolactone adduct (Ex. A), 336 g. ____ 11
Ethylene glycol, 89 g. _____ 21
Tetrabutyl titanate catalyst, 1 g.
Cresylic acid, 326 g.

Following the procedure of Example I, the above mixture was reacted to a Gardner-Holt viscosity of Z-7 at 30% solids in cresylic acid. The mixture was diluted with a 60/40 blend of cresylic acid-Solvesso 100 to 31% solids.

EXAMPLE IVA

To 1400 g. of the above was added 21 g. of Mondur SH, 53 g. of a 40% solution of phenolic resin, 12 g. of a 15% solution of TBT in a mixture of cresylic acid and Solvesso 100, and 5.4 g. of a 6% solution of cobalt naphthenate. This was applied on wire.

EXAMPLE IVB

To 1060 g. of the mixture prepared in IVA was added 10.6 g. of Arochlor 1221. This was applied on wire.

CAPROLACTAM EXAMPLES

A series of examples prepared from the caprolactam reaction product of Example AI are similarly employed to prepare resins which are analogous to those shown in Example I through IV above which are also employed as wire enamels.

Since the following examples are similarly prepared, they are presented in tabular form with the most relevant details being presented in Table A. DMT is dimethyl terephthalate. EG is ethylene glycol.

For convenience the equivalents percent employed in the following tables will be rounded out to the closest whole number.

TABLE A.—POLYESTERS

| Example | Acid | Equivalent, percent | Glycol | Equivalent, percent | PEIC Ex. A equivalent, percent |
|---|---|---|---|---|---|
| 1 | DMT | 45 | | | 55 |
| 2 | Dimethyl isophthalate (DMI) | 45 | EG | 25 | 30 |
| 3 | 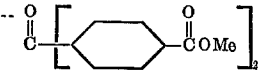 | 50 | Diethylene glycol | 21 | 29 |
| 4 | Trimellitic anhydride (TMA) | 45 | EG | 30 | 25 |
| 5 | DMT | 50 | EG | 20 | [1] 25 |
| 6 | {DMT / adipic acid} | {40 / 5} | EG | 25 | 30 |
| 7 | DMT | 45 | Neopentyl glycol | 20 | 35 |
| 8 | {DMT / DMI} | {25 / 25} | Diethylene glycol | 21 | 29 |
| 9 |  / DMT | {31 / 19} | EG | 21 | 29 |
| 10 | DMT | 45 | Butanediol-1,4 | 25 | [1] 25 |
| 11 | DMT | 45 | Diethylene glycol | 25 | [2] 15 / [3] 15 |
| 12 | 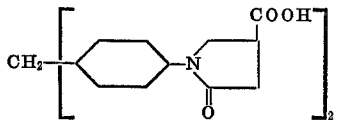 | 43 | EG | 37 | 20 |
| 13 | 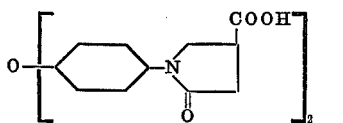 | 40 | EG | 40 | 20 |
| 14 | DMT | 45 | EG | 20 | [3] 35 |

[1] Glycerol 5.   [2] Example A.   [3] Example AI.

EXAMPLE V

This is an example of polyester-imide wire enamel.

| | Equiv. percent |
|---|---|
| Dimethyl terephthalate, 136 g. | 9 |
| Ethylene glycol, 227 g. | 47 |
| Trimellitic anhydride, 403 g. | 27 |
| Methylene dianiline, 138 g. | 10 |
| THEIC-caprolactone adduct, 221 g. (Ex. A) | 7 |
| (TBI) catalyst, 1.5 g. | |
| Cresylic acid, 666 g. | |

To the above mixture was added toluene (5% based on solids) and the mixture was treated under a carbon dioxide blanket, to 220° C. until a Gardner-Holt viscosity of Q½ at 30% solids in cresol was obtained. The reaction mixture was thinned to 30% solids with a blend of 60% cresylic acid and 40% Solvesso 100.

EXAMPLE VA

To 1400 g. of the above mixture was added 24 g. of Mondur SH, 96 g. of biphenyl, 48 g. of a 40% solution of phenolic resin, 9.6 g. of TBT solids, 6.4 g. of a 6% solution of cobalt naphthenate and 2.1 g. of a 6% solution of cerium naphthenate. This was applied on wire.

EXAMPLE VB

To 1666 g. of the above base resin Ex. V was added 29 g. of Mondur SH, 143 g. of biphenyl, 72 g. of a 40% solution of phenolic resin, 15.37 g. of TBT solids, 9.5 g. of a 6% solution of cobalt naphthenate and 3.1 g. of a 6% solution of cerium naphthenate. This mixture was applied on wire.

EXAMPLE VI

Example V was repeated except that the reaction was stopped when a Gardner-Holt viscosity of R½ at 30% solids in cresol was obtained. The mixture was diluted to 29% solids with a 60/40 blend of cresylic acid-Solvesso 100.

EXAMPLE VIA

To 1480 g. of the above base resin Ex. VI was added 14.6 g. of TBT solids. This was applied on wire.

EXAMPLE VIB

To 1410 g. of the above base resin Ex. VI was added 25.43 g. of Mondur SH resin, 129 g. of biphenyl, 64.4 g. of a 40% solution of phenolic resin, 13.84 g. of TBT solids, 8.6 g. of a 6% solution of cobalt naphthenate and 2.8 g. of a 6% solution of cerium naphthenate. This was applied on wire.

Since the following examples are similarly prepared they are presented in tabular form with the most relevant details being presented in Table B.

TABLE B.—POLYESTER-AMIDE AND/OR IMIDE

| Example | Acid | Equivalent, percent | Glycol | Equivalent, percent | PEIC Ex. A. equivalent, percent | Polyamine | Equivalent, percent |
|---|---|---|---|---|---|---|---|
| 1 | DMT | 50 | Diethylene glycol | 14 | 14 | H₂N—⌬—O—⌬—NH₂ | 22 |
| 2 | TMA | 50 | EG | 15 | 15 | H₂N—⌬—⌬—NH₂ | 20 |
| 3 | Pyromellitic anhydride | 45 | EG | 15 | 20 | H₂N—⌬—C(CH₃)₂—⌬—NH₂ | 20 |
| 4 | DMT / TMA | 29 / 21 | | | 30 | H₂N—⌬—⌬—NH₂ | 20 |
| 5 | DMT / TMA | 18 / 32 | Diethylene glycol | 15 | 15 | H₂N—⌬—CH₂—⌬—NH₂ | 20 |
| 6 | TMA | 45 | | | 40 | H₂N—⌬—O—⌬—NH₂ | 15 |

TABLE B.—POLYESTER-AMIDE AND/OR IMIDE

| | Acid | Equivalent, percent | Glycol | Equivalent, percent | PEIO Ex. A. equivalent, percent | Polyamine | Equivalent, percent |
|---|---|---|---|---|---|---|---|
| 7 | [p-MeOOC-C₆H₄-COOMe] | 45 | EG | 20 | 15 NH₂ | [C₆H₄-NH₂—O—C₆H₄-NH₂] | 20 |
| 8 | {TMA / DMT} | ---- | {EG / EG} 25/25 | 20 | 15 NH₂ | [C₆H₄-NH₂] | 15 |
| 9 | [p-MeOOC-C₆H₄-COOMe] / TMA | 25 / 25 | Diethylene glycol | 15 | 15 NH₂ | [C₆H₄-NH₂—CH₂—C₆H₄-NH₂] | 20 |
| 10 | [HOOC-(imide-CH₂)₂ ]/ TMA | 10 / 30 | EG | 36 | 9 Same as above | ---- | 15 |
| 11 | [HOOC-(imide-O)₂ ]/ TMA | 12 / 28 | EG | 35 | 11 ...do... | ---- | 14 |
| 12 | {DMT / TMA} | 10 / 30 | EG | 24 | ¹14 ...do... | ---- | 22 |
| 13 | {DMT / TMA} | 10 / 30 | EG | 24 | ¹14 NH₂ | [C₆H₄-NH₂—O—C₆H₄-NH₂] | 22 |
| 14 | {DMT / TMA} | 10 / 30 | EG | 24 | ¹,²7 Same as above | ---- | 22 |

¹ Example A.  ² Example A1.

A polycarboxylic acid may also be pre-reacted with a polyamine or a polyol and then reacted in accordance with this invention as illustrated in the following examples.

EXAMPLE VII

One mole of trimellitic anhydride and 0.5 mole of

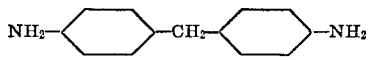

are reacted in 500 g. of N-methylpyrrolidone to yield a product which is predominantly

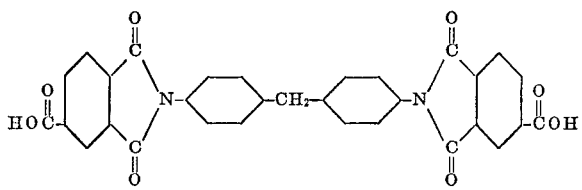

EXAMPLE VIII

Six (6) moles of TMA and three (3) moles of hydroquinone diacetate are heated with stirring for about two hours up to a maximum temperature of about 300° F., the acetic acid being distilled off as formed. The product is predominantly p-phenylene-bis(trimellitate) dianhydride

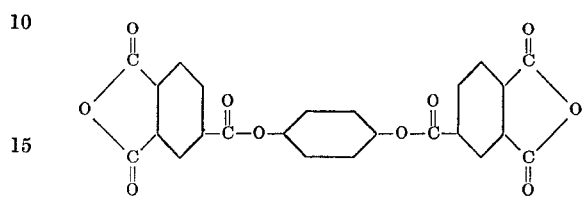

These preformed acids or anhydrides are employed to prepare the resins of this invention as illustrated in the following Tables C and D.

TABLE C

Resins prepared from 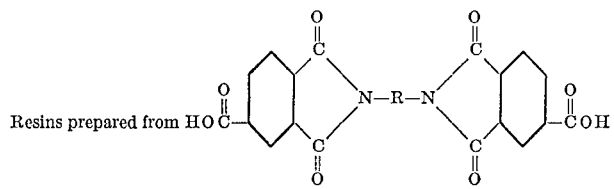

| Example | Preformed imideacid, R = | Equivalent, percent | Additional acid | Equivalent, percent | Glycol | Equivalent, percent | PEIC Ex. A, equivalent, percent |
|---|---|---|---|---|---|---|---|
| 1 | –⌬– | 45 | | | EG | 25 | 30 |
| 2 | –⌬–CH₂–⌬– | 30 | DMT | 20 | | 20 | 30 |
| 3 | –⌬–O–⌬– | 45 | | | | | 55 |
| 4 | –⌬–C(CH₃)₂–⌬– | 45 | | | | | 55 |
| 5 | –⌬–⌬– | 22 | DMT | 22 | EG | 25 | 31 |
| 6 | –⌬–CH₂–⌬– | 45 | | | | | 55 |
| 7 | –⌬– | 50 | | | Diethylene glycol | 20 | 30 |
| 8 | –⌬–CH₂–⌬– | 45 | | | EG | 25 | [1] 30 |
| 9 | Same as above | 45 | | | EG | 25 | [1][2] 15 |

[1] Example A1. [2] Example A.

TABLE D

Resins prepared from

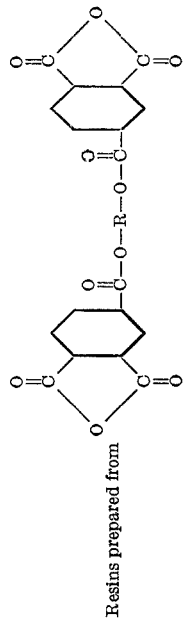

| Example | Preformed acid R= | Equivalent, percent | Additional acid | Equivalent, percent | Glycol | Equivalent, percent | PEIC Ex. A, equivalent, percent | Amine | Equivalent, percent |
|---|---|---|---|---|---|---|---|---|---|
| 1 | (phenyl) | 25 | DMT | 25 | | | 30 | NH₂—(phenyl)—NH₂ | 20 |
| 2 | (phenyl)—C(CH₃)₂—(phenyl) | 50 | | | Diethylene glycol | 10 | 20 | NH₂—(phenyl)—O—(phenyl)—NH₂ | 20 |
| 3 | (phenyl)—O—(phenyl) | 45 | | | | | 35 | NH₂—(phenyl)—CH₂—(phenyl)—NH₂ | 20 |
| 4 | (phenyl)—CH₂—(phenyl) | 45 | | | | | 40 | NH₂—(phenyl)—C(CH₃)₂—(phenyl)—NH₂ | 15 |

Corresponding caprolactam derived products are similarly prepared wherein the product of Example AI is employed in place of the product of Example A in any of the above tables. The above products can also be prepared as oil modified products by employing a fatty acid or oil.

The above are representative examples of PEIC derivatives that can be employed to prepare the polymers of this invention by substituting the specific PEIC derivatives in any of the above PEIC formulations.

The PEIC derivatives of this invention can be reacted to form resins in the manner described for THEIC resins to produce PEIC resins and wire enamels which are equal or superior to the corresponding resins produced from THEIC.

By way of example, the following patents and patent applications describe polymers which are characterized by the presence of isocyanurate units, such as hydroxyalkyl-isocyanurates and most preferably tris(hydroxyalkyl) isocyanurate. PEIC derivatives can be substituted for THEIC in whole or in part in the following patents to produce the resins of the present invention as well as corresponding wire enamels and other insulating materials.

(1) U.S. Pat. 3,297,785 relating to melamine-aldehyde resin modified polyester reaction products.

(2) U.S. Pat. 3,312,645 relating to oil-modified polyester reaction products and oil-modified phenol-aldehyde resin reaction products.

(3) U.S. Pat. 3,342,780 relating to the reaction product of a dibasic polycarboxylic acid and tris(2-hydroxyethyl) isocyanurate.

(4) U.S. Pat. 3,249,578 relating to a coating composition of a dibasic polycarboxylic acid/tris (2-hydroxyethyl) isocyanurate.

(5) U.S. patent application Ser. No. 593,729, filed Nov. 14, 1966, now abandoned, relating to polyester-amide and/or imides containing tris(2-hydroxyethyl) isocyanurate.

(6) Belgian Pat. 1,456,575 relating to the reaction of a terephthalic acid, a polyol and tris(2-hydroxyethyl) isocyanurate and/or tris(2-carboxyethyl)-isocyanurate and a condensation product of trimellitic-triethylene glycol and an aromatic amine.

(7) British Pat. 1,049,650 relating to the polyester of benzophenone-dicarboxylic acid and tris(2-hydroxyethyl) isocyanurate.

(8) U.S. Pat. 3,426,098 relating to polyester-polyimides containing tris(2-hydroxyethyl) isocyanurate.

These patents and patent applications are incorporated by reference into this patent application as if a part hereof.

USE AS WIRE ENAMEL

When resins of the present invention are to be employed as magnet wire enamels, the resins are applied to the wires from solution by well-known methods. For optimum results we have found that solutions containing from about 20 to 40 percent resin solids should be employed. These solutions can be prepared by diluting higher concentration resin solutions with any of the resin solvents mentioned above.

The method of applying the resin to wire comprises passing the wire through the resin solution, through a suitable die, and then through an oven maintained at an elevated temperature to cure the resin on the wire. Where desired, the wire may be passed through the resin solution and a die a number of times and through the oven after each pass through the resin solution. This will provide a greater enamel build than is obtainable with only one pass through the resin solution. Although the die sizes are not critical, we prefer to employ dies which provide a clearance of from two to four mils around the wire. The speed at which the wire is passed through the resin solution and the temperature at which the oven is maintained depend on the particular resin solution employed, the build of enamel desired, the length of the oven in which the coated wire is cured, and the molecular weight of the resin used in the coating operation. We have found that an enamel build on a 40.3 mil or 18 wire round copper wire of about 3 mils (diameter of enameled wire less diameter of bare wire) may be obtained by passing the wire through a solution containing 25–35%, by weight, of a suitable resin and through a heating tower 18 feet long at speeds of from about 15 to 100 feet per minute when the temperature of the curing oven is maintained at from about 800° F. to 1000° F. In general, the higher the wire speed, the higher is the optimum wire curing tower temperature. In the coating operation just described, the wire is generally passed through the resin solution and a wire tower six times to obtain the desired build. In addition, the wire can be coated by dip application, groove rolls, etc.

In order to insure complete curing of the resins of the present invention when applying them to conductors, it is desirable to employ a curing catalyst to accelerate the curing reaction in the resin solutions during the coating operation, although satisfactory results are obtained without the use of such a catalyst. Among the many curing catalysts suitable for this purpose may be the soluble salts of Zn, Pb, Ti, Cd, Bo, Th, etc., for example zinc octoate, cadmium octoate, copper naphthenate, tetraisopropyl titanate, tetrabutyl titanate, etc., aromatic polyisocyanates, aliphatic polyisocyanates, etc. Examples of polyisocyanates are those disclosed in U.S. Pat. 3,211,585 including the blocked isocyanates which are by reference incorporated herein as if part hereof. Where metal-containing curing catalysts are employed we have obtained satisfactory results using from about 0.05 to 4.0 or more percent, by weight, of the metal element of the catalyst based on the total resin solids. Preferably, we use sufficient metal-containing catalyst to give about 0.1–2.0 percent metal based on the total resin solids and when using the polyisocyanates we use about 20–25 percent, by weight, of the isocyanate based on the total resin solids present. Where other cross-linking resins are employed for example triazine resins such as melamine-aldehyde resins or modified derivatives thereof, one employs 1–10%, such as 1.5–8% but preferably 2–4% based on total solids.

The properties of the resin can be improved by the addition of a polyisocyanate in an amount of 10–40%, preferably 15 to 25% by weight of the total of the polyisocyanate and resin. Preferably, the polyisocyanate has at least three available isocyanate groups.

Among the polyisocyanates which can be employed there may be mentioned diisocyanates such as 2,4-tolylene diisocyanate, 2,6-tolylene diisocyanates, cyclopentylene diisocyanate, m-phenylene diisocyanate, p-phenylene diisocyanate, ethylene diisocyanate, butylidene diisocyanate, 1,5-naphthalene diisocyanate, 1,6-hexamethylene diisocyanate, diansidine diisocyanate, 4,4'-diphenyl ether diisocyanate, 4,4',4''-triphenyl methane triisocyanate (Desmodur R), the cyclic trimer of 2,4-tolylene diisocyanate, the cyclic trimer of 2,6-tolylene diisocyanate, mixtures of the cyclic trimers of 2,4-tolylene diisocyanate and 2,6-tolylene diisocyanate, the trimer of 4,4'-diphenyl methane diisocyanate, trifunctional isocyanate trimers having the formula:

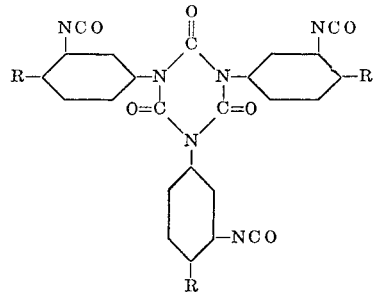

where R is a lower alkyl radical, e.g., n-butyl, tertiary butyl, secondary butyl, isopropyl, methyl, ethyl, etc., 1,3,5-triisocyanate benzene, 2,4,6-triisocyanate toluene, 4,4'-dimethyldiphenylmethane, 2,2',5,5'-tetraisocyanate, 2,4,4'-triisocyanate diphenylmethane, 2,4,6-triisocyanate diphenyl ether, 2,2',4-triisocyanate diphenyl sulfide, 2,4,4'-triisocyanate diphenyl sulfide, 2,3',4-triisocyanate-4'-methyl diphenyl ether, 2,3',4-triisocyanate-4'-methoxydiphenyl ether, 2,4,4'-triisocyanate-3'-chlorodiphenyl ether, 2,4,4'-triisocyanate-3',5'-dimethyl diphenyl ether, 4,4',6-diphenyl triisocyanate, 1,2,4-butanetriol triisocyanate, 1,3,3-pentane triisocyanate, 1,2,2-butane triisocyanate, phloroglucinol triisocyanate, the reaction product of 3 mols of 2,4-tolylene diisocyanate with 1 mol of trimethylol propane, the reaction product of 3 mols of 2,6-tolylene diisocyanage with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups.

While the polyisocyanates can be used as such, particularly where pot life is not important, it is preferred to block the isocyanate groupings with a group that will split off at the reaction temperature employed with the polymeric terephthalic or isophthalic ester. Typical compounds which can be used to block the isocyanate groupings, e.g. by forming carbamates therewith, are monohydric phenols, such as phenol, meta-cresol, para-cresol, ortho-cresol and mixtures thereof, the xylenols, e.g., 2,6-dimethyl phenol, 4-ethyl phenol, 4-tertiary butyl phenol, 2-butyl phenol, 4-n-octyl phenol, 4-isooctyl phenol, 2-chloro phenol, 2,6-dichloro phenol, 2-nitro-phenol, 4-nitro phenol, 3-nitro phenol, monohydric alcohols such as methyl alcohol, ethyl alcohol, n-propyl alcohol, isopropyl alcohol, tertiary butyl alcohol, tertiary amyl alcohol, octyl alcohol, stearyl alcohol, acetoacetic ester, hydroxyalkylcarbamic acid aryl esters, e.g. hydroxyethylcarbamic acid phenyl ester, hydroxyethylcarbamic acid cresyl ester, diethyl malonic, mercaptans, e.g., 2-mercaptobenzothiazole, 2 mercaptothiazoline, dodecyl mercaptan, ethyl 2-mercaptothiazole, p-naphthyl mercaptan, a-naphthyl mercaptan, methyl mercaptan, butyl mercaptan, lactams, e.g., ε-caprolactam, Δ-valerolactam, γ-butyrolactam, β-propiolactam, imides, e.g., succinimide, phthalimide, naphthalimide, glutarimide, dimethylphenyl carbinol, secondary amines, e.g., o-ditolylamine, m-ditolylamine, p-ditolylamine, N-phenyl toluidine, phenyl-a-naphthylamine, carbazole, diphenylamine, etc. mono-a-phenylethyl phenol, di-a-phenylethyl phenol, tri-a-phenylethyl phenol, carvacrol, thymol, methyl diphenyl carbinol, triphenyl carbinol, 1-nitro tertiary butyl carbinol, 1-chlorotertiary butyl carbinol, triphenyl silanol, 2,2'-dinitrodiphenyl-amine, 2,2'-dichlorodiphenylamine, ethyl n-butyl malonate, ethyl benzyl malonate, acetyl acetone, acetonyl acetone, benzimidazole, 1-phenyl-3-methyl-5-pyrazolone.

As specific examples of such blocked polyisocyanates, there may be mentioned Mondur SH, wherein the isocyanate groups of the reaction product of 3 mols of mixed 2,4- and 2,6-tolylene diisocyanate with trimethylol propane are blocked by esterification with m-cresol. At present Mondur SH is the preferred polyisocyanate.

Other blocked polyisocyanates include the cyclic trimer of 2,4-tolylene diisocyanate having the isocyanate groups blocked with tertiary butyl alcohol or tertiary amyl alcohol or dimethyl ethinyl carbinol or aceto-acetic acid ester or phenol or cresylic acid or ε-caprolactam or 2-mercaptobenzothiazole or succinimide or phthalimide or diphenyl amine or phenyl-β-naphthyl amine, triphenyl methane triisocyanate having the isocyanate groups blocked with phenol or mixed cresols or tertiary butyl alcohol of phthalimide, 1,3,3-pentanetriisocyanate having the isocyanate groups blocked with m-cresol, etc.

Unless otherwise stated hereinafter in the specification and claims, it is understood that whenever the term "polyisocyanate" is employed, it is intended to include both the free isocyanates and the blocked isocyanates.

Where the resins of this invention are to be employed as slot insulation in dynamoelectric machines, it is necessary to form cured sheets or films of the resin. This can be accomplished by any of the conventional film-forming methods such as casting a solution of resin and heating the casting to drive off the solvent and curing the resin. Films can also be formed by extruding viscous solutions of the resins into a heated chamber where curing takes place. Film formed from these resins are tough, flexible products having high dielectric strength, thermal stability and high tensile strength. These films may be used as slot insulation on dynamoelectric machines by lining the slots in armatures with the film and placing the insulated windings into the lined slots. These films can also be used as the dielectric material in capacitors and are particularly valuable for use in aluminum foil type capacitors.

In order to determine whether the insulation on a magnet wire will withstand mechanical, chemical, electrical and thermal stresses encountered in winding machines and electrical apparatus, it is customary to apply the resin to a conductor and to subject the enameled wire to a series of tests which have been designed to measure the various properties of the enamel on the wire.

The wire enamels were prepared in a conventional manner. The resins prepared herein were diluted with a mixed solvent to a resin content of 25–35% by weight. The mixed solvent has a weight ratio of 6:3 to 6:4 cresylic acid to aromatic solvent. The aromatic solvent contained equal parts by weight of Solvesso 100 and Solvesso 150. Other solvents include halogenated coal tar solvents and solvents such as N-methyl pyrrolidone, dimethyl sulfoxide, dimethylformamide and other similar solvents alone or in combination.

The resins of the present invention possess excellent mechanical, chemical, tehrmal and electrical properties. The desirable properties will depend on the particular application to which they are applied. Where the resins are employed as wire enamels, the desired properties will depend on the conditions under which the wire enamels are employed.

The resins of this invention yield wire enamels capable of operation at temperatures above 200° C. The commercial importance of such resins is so well recognized that they are known to the trade as "200 Type Wire Enamels."

As stated above, PEIC derivatives can be employed in place of THEIC in resins, i.e. as polyesters, polyesteramides, polyesterimides, polyester amide-imides, etc. to yield superior wire enamels. In addition both PEIC derivatives and THEIC can be employed in the same resin.

Wires insulated with the wire enamels containing PEIC derivatives of this invention can be further improved by applying over the enamel layer an overcoat of a highly linear thermoplastic polymer.

The thickness of the outer layer of the linear polymer normally is preferably at least 10% of the thickness of the inner enamel layer but substantially thinner than the inner layer. Such an outer layer improves physical properties, particularly improving heat shock.

For the thermoplastic linear polymer of the outer layer, a polyester resin obtained by reacting a dihydric alcohol with an aromatic dicarboxylic acid is particularly suitable. Preferably, the linear polymer is a glycol-terephthalate polyester of the dominantly high molecular weight, such as polyethylene terephthalate known in the trade as "Dacron" or "Mylar." Examples of other such linear polyesters well adapted for this use are polycyclohexylene dimethyleneterephthalate known in the trade as "Kodel" of the fiber-forming type, a polyethylene terephthalate known as "celanese Polyester Fortrel" (a product of Fiber Industries, Inc.), and a polyethylene terephthalate-isoterephthlate product of Goodyear known as "Vicron." Also suitable for this purpose is a polyaromatic polycarboxylic aromatic imide known as Du Pont's M.L. polyimides for example those disclosed in U.S. Pat. 3,179,634 which has good thermal life, and, like the terephthalic base materials, can eliminate heat and solvent shock and meet the other requirements of a high temperature magnet wire. Other equivalent materials can be employed.

The linear thermoplastic polymer of the outer insulating layer of a wire made according to the invention acts as a rubber-like band of high tensile strength which, when the conductor is bent or stretched and heated, prevents heat shock in the underlying layer of enamel. Further, the greater toughness and insolubility of this outer layer greatly enhance the physical and chemical properties of the finished wire. Since highly linear polymers such as dihydric alcohol-terephthalate polyesters have excellent heat resistance, they do not detract from the overall thermal properties of the finished wire.

The outer layer of thermoplastic linear polymer should preferably be at least about 10% of the thickness of the inner layer of thermosetting non-linear polyesteramide. This is particularly so for round wire "Triple," sizes 8 through 40. For square and rectangular wire as well as round wire, "Single" and round wire "Heavy," the outer layer should constitute at least 13% of the total thickness or "build" of the combined inner and outer layers. On the other hand, the outer layer should be substantially thinner than the inner layer and preferably not greater than 25% of the inner layer thickness. Normally, the desired ratio of the two layers thicknesses can be obtained by applying from three to seven coats of the inner layer material and one or at least two coats of the outer layer material, each coat being applied by a wiping die and over-cured in the conventional manner before application of the next coat.

OVERCOATED WIRE ENAMEL EXAMPLES

The wire enamels produced herein are overcoated with the following resins:
(1) Dacron.
(2) Kodel.
(3) Fortrel.
(4) Vicron.
(5) M–L polyimide polymers, for example

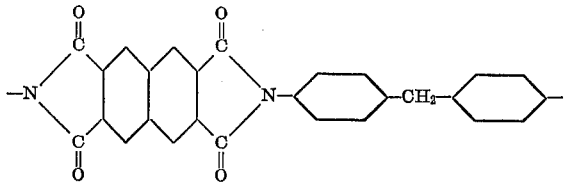

to produce a superior wire insulator having excellent heat shock.

(6) These wire enamels are also overcoated with the polyamide-imides of the U.S. Pat. 3,428,486 which is incorporated herein as part hereof. For example, the present wire enamels may be overcoated with the polyamide-imides of trimellitic anhydride and polyamines such as phenylene diamine. A suitable commercial overcoat is Amoco 1A Type 10.

The following examples are presented to illustrate wire enamels prepared from the resins of this invention. The tests employed are conventional tests. The polyimide employed has the following polymeric unit:

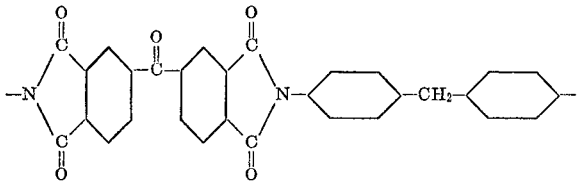

| Wire construction | Wire I—4 coats of Example IA, 2 coats of polyimide | Wire II—4 coats of Example IB, 2 coats of polyimide |
|---|---|---|
| Wire size, AWG | 18 | 18. |
| Oven heat, ° F | 680 | 680. |
| Wire speed, ft./min | 35 | 35. |
| Film thickness, mils | 1.3 | 1.3. |
| Wire surface | Smooth | Smooth. |
| Flex | OK 1-X | OK 1-X. |
| Snap | OK | OK. |
| Snap plus mandrel | 25% OK 1X | 25% OK 2X. |
| Adherance | Good | Good. |
| Elongation, percent | 36 | 40. |
| Elongation plus mandrel | OK 3X | OK 3X. |
| Scott twist | 113 | 105. |
| Repeated scrapes, strokes | 61 | 45. |
| Unilateral scrape, grams | 1333 | 1,066. |
| Emerson single scrape, pounds | 24 | 22. |
| Dielectric breakdown, volts/mil | 7100 | 9,000. |
| Cut-thru, ° C | Not taken | 368. |
| Heat shock (200° C.), 20% stretch | OK 3X | OK 3X. | solvent to a surface by brushing or spraying with subsequent curing. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates.

While representative embodiments of this invention have been presented, it will be apparent to those skilled in the art that various changes and modifications may be made without departing from the spirit and scope of the invention.

Having thus described our invention what we claim as new and desire to obtain by Letters Patent is:

1. Resin products formed by reacting reactants including (1) a preesterified hydroxyalkyl isocyanurate-lactone reaction product or a preesterified hydroxyalkyl isocyanurate-lactam reaction product and (2)(i) polycarboxylic and esters thereof or (ii) glycol or (iii) polyol or (iv) mixtures thereof.

2. Resin products of claim 1 wherein hydroxyalkyl isocyanurate is tris(2-hydroxyethyl) isocyanurate.

3. A resin product of claim 2 which is a polyester.

4. A resin product of claim 2 which is a polyesteramide or a polyester-imide or a polyester-amide-imide.

5. Resin products of claim 2 wherein the tris(2-hydroxyethyl) isocyanurate-lactone reaction product or the tris(2-hydroxyethyl) isocyanurate-lactam reaction product has the formula

| Wire construction | Wire III—4 coats Ex. IIA, 2 coats polyimide | Wire IV—4 coats Ex. IIB, 2 coats polyimide | Wire V—4 coats Ex. IIC 2, coats polyimide | Wire VI—4 coats Ex. IIIA, 2 coats polyimide | Wire VII—4 coats Ex. IIIB, 2 coats polyimide |
|---|---|---|---|---|---|
| Wire size | 18 A.W.G | 18 A.W.G | 18 A.W.G | 18 A.W.G | 18 A.W.G. |
| Oven heat | 680° F | 680° F | 680° F | 680° F | 680° F. |
| Wire speed | 35 ft./min | 35 ft./min | 35 ft./min | 35 ft./min | 35 ft./min. |
| Flex | OK 1-X | OK 1-X | OK 1-X | OK 1-X | OK 1-X. |
| Snap | OK | OK | OK | OK | OK. |
| Snap and mandrel (25%) | OK 1-X | OK 2-X | OK 1-X | OK 3-X | OK 2-X. |
| Adherance | Good | Good | Good | Good | Good. |
| Elongation, percent | 36 | 36 | 36 | 37 | 34. |
| Elongation and mandrel | OK 3-X | OK 3-X | OK 3-X |  | OK 3-X. |
| Scott twist | 113 | 107 | 112 | 101 | 104. |
| Repeated scrapes (strokes) | 29 | 34 | 40 | 85 | 73. |
| Unilateral scrape (grams) | 1,166 | 1,550 | 1,200 | 1,200 | 1,303. |
| Emerson single scrape (lbs.) | 20½ | 13 | 15½ | 15½ | 18½. |
| Dielectric breakdown (volt/mil) | 8,333 | 7,300 | 8,500 | 7,533 | 6,866. |
| Cut-thru (° C.) | 388 | 395 | 422 | 408 | 432. |
| Heat shock (200° C.) (20%) | OK 4-X | OK 4-X; OK 4-X at 260° C. | OK 3-X; OK 3-X at 240° C. | OK 3-X | OK 3-X; at 220° C. |

| Wire construction | Wire VIII—4 coats Ex. IVA, 2 coats polyimide | Wire IX—4 coats Ex. IVB, 2 coats polyimide | Wire X—6 coats Ex. VA | Wire XI—6 coats Ex. VIA | Wire XII—6 coats Ex. VIB |
|---|---|---|---|---|---|
| Wire size | 18 A.W.G | 18 A.W.G | 18 A.W.G | 18 A.W.G | 18 A.W.G. |
| Oven heat | 680° F | 680° F | 680° F | 680° F | 680° F. |
| Wire speed | 35 ft./min | 35 ft./min | 35 ft./min | 35 ft./min | 35 ft./min. |
| Flex | OK 1-X | OK 1-X | OK 1-X | OK 1-X | OK 1-X. |
| Snap | OK | OK | OK | OK | OK. |
| Snap and mandrel (25%) | OK 2-X | OK 2-X | OK 2-X | OK 1-X | OK 3-X. |
| Adherance | Good | Good | Good | Good | Good. |
| Elongation, percent | 35 | 36 | 35 | 35 | 38. |
| Elongation mandrel |  |  | OK 3-X | OK 2-X |  |
| Scott twist | 107 | 109 | 109 | 127 | 198. |
| Repeated scrapes (strokes) | 60 | 40 | 13 | 75 | 65. |
| Unilateral scrape (grams) | 1,200 | 1,233 | 1,000 | 1,100 | 1,066. |
| Emerson single scrape (lbs.) | 18½ | 18½ | 12½ | 20½ | 13. |
| Dielectric breakdown (volt/mil) | 9,900 | 9,500 | 8,466 | 12,500 | 7,666. |
| Cut-thru (° C.) |  | 407 | 310 |  |  |
| Heat shock (200° C.) (20%) | OK 4-X; OK 4-X at 220° C. |  |  |  | OK 3-X. |

Although the reaction has been illustrated with lactones analogous products can also be prepared by substituting the THEIC-lactam reaction product (Ex. AI) in the above Examples.

Although the utility of the resins of our invention has been described principally in terms of electrical applications, it should be understood that these resins may be used in all of the other applications suitable for synthetic resins. Thus, these resins can be employed in protective coating applications by applying the resin in a suitable solvent to a surface by brushing or spraying with subsequent curing.

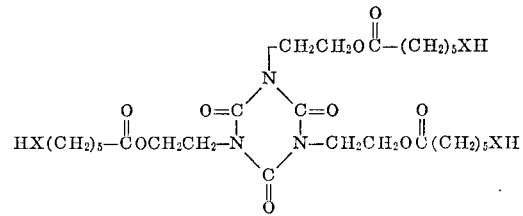

where X=O or

6. A resin product of claim 5 which is a polyester.

7. The resin product of claim 6 wherein (2)(iv) is a mixture of iso- or tere-phthalic acid and glycol.

8. A resin product of claim 5 which is a polyester-amide or a polyester-imide or a polyester-amide-imide, said reactants also including trimellitic anhydride.

9. The resin product of claim 8 wherein (2)(i) is iso- or tere-phthalic acid and said reactants include an aromatic amine.

10. The resin product of claim 9 wherein (2) (ii) is glycol.

11. Fatty oil modified polyester or polyester-amide or polyester-imide or polyester-amide-imide resin products of claim 1.

12. Fatty oil modified polyester or polyester-amide or polyester-imide or polyester-amide-imide resin products of claim 2.

13. The fatty oil modified polyester resin product of claim 3.

14. The fatty oil modified resin product of claim 4.

15. Fatty oil modified polyester or polyester-amide or polyester-imide or polyester-amide-imide resin products of claim 5.

16. The fatty oil modified polyester resin product of claim 6.

17. The fatty oil modified resin product of claim 8.

18. The fatty oil modified resin product of claim 7.

19. The fatty oil modified resin product of claim 9.

20. The fatty oil modified resin product of claim 10.

21. An electrical conductor insulated with a resin product of claim 1.

22. An electrical conductor insulated with a resin product of claim 2.

23. An electrical conductor insulated with the resin product of claim 3.

24. An electrical conductor insulated with the resin product of claim 4.

25. An electrical conductor insulated with a resin product of claim 5.

26. An electrical conductor insulated with the resin product of claim 6.

27. An electrical conductor insulated with the resin product of claim 8.

28. An electrical conductor insulated with the resin product of claim 7.

29. An electrical conductor insulated with the resin product of claim 9.

30. An electrical conductor insulated with the resin product of claim 10.

31. An electrical conductor insulated with a resin product of claim 11.

32. An electrical conductor insulated with a resin product of claim 12.

33. An electrical conductor insulated with the resin product of claim 13.

34. An electrical conductor insulated with the resin product of claim 14.

35. An electrical conductor insulated with a resin product of claim 15.

36. An electrical conductor insulated with the resin product of claim 16.

37. An electrical conductor insulated with the resin product of claim 17.

38. An electrical conductor insulated with the resin product of claim 18.

39. An electrical conductor insulated with the resin product of claim 19.

40. An electrical conductor insulated with the resin product of claim 20.

References Cited

UNITED STATES PATENTS

| | | | |
|---|---|---|---|
| 3,184,438 | 5/1965 | Phillips et al. | 260—78 |
| 3,279,940 | 10/1966 | Francis et al. | 117—94 |
| 3,297,785 | 1/1967 | George et al. | 260—850 |
| 3,331,839 | 7/1967 | Little | 260—248 |
| 3,415,903 | 10/1968 | Bottger | 260—857 |
| 3,485,833 | 12/1969 | Sadle | 260—248 |

DONALD E. CZAJA, Primary Examiner

R. W. GRIFFIN, Assistant Examiner

U.S. Cl. X.R.

117—132 R, 161 KP, 232, DIG. 7; 260—16, 20, 21, 22 CB; 22 CQ, 22 S, 23.7 R, 26, 40 TN, 75 TN, 77.5 NC, 78 L, 248 NS, 824, 843, 850, 860, 862